US005542185A

United States Patent [19]

Boda

[11] Patent Number: 5,542,185

[45] Date of Patent: Aug. 6, 1996

[54] DEVICE FOR DESCRIBING ARCS

[75] Inventor: James C. Boda, Merrimac, Wis.

[73] Assignee: Fiskars Inc., Madison, Wis.

[21] Appl. No.: 228,248

[22] Filed: Apr. 15, 1994

[51] Int. Cl.[6] .......... G01B 3/16

[52] U.S. Cl. .......... 33/27.02; 33/27.031; 33/27.033

[58] Field of Search .......... 33/27.02, 27.031, 33/27.033; 30/164.9, 164.95, 295

[56] References Cited

U.S. PATENT DOCUMENTS

| | | | |
|---|---|---|---|
| 288,235 | 11/1883 | Hanstein | 33/27.02 |
| 595,607 | 12/1887 | Coykendall | 33/27.02 |
| 1,263,182 | 4/1918 | Wolthausen | 33/27.02 |
| 2,537,058 | 1/1951 | Jamison, et al. | 33/27.02 |
| 2,754,586 | 7/1956 | Manstorp | 33/27.031 |
| 3,247,597 | 4/1966 | Brown | 33/27.02 |
| 3,280,466 | 10/1966 | Heimberger | 33/27.02 |
| 3,543,406 | 12/1968 | Kolb | 33/27.02 |
| 3,797,119 | 3/1974 | McDow | 33/27.02 |
| 5,014,436 | 5/1991 | Kozyrski et al. | 33/27.031 |

FOREIGN PATENT DOCUMENTS

| | | | |
|---|---|---|---|
| 34825 | 8/1925 | Denmark | 33/27.02 |
| 478683 | 7/1929 | Germany | 33/27.02 |
| 47965 | 7/1909 | Switzerland | 33/27.02 |
| 70640 | 3/1916 | Switzerland | 33/27.02 |
| 360507 | 4/1962 | Switzerland | 33/27.02 |

*Primary Examiner*—Christopher W. Fulton
*Attorney, Agent, or Firm*—Foley & Lardner

[57] ABSTRACT

The present invention is directed to a device for describing arcs. The device includes a pair of legs connected at a pivot joint. A shoe is disposed at the end of one leg to support the device and maintain the center point of the arc while the device is used. An instrument is attached to the other leg so arcs can be formed as the device is rotated about the shoe. A rack and wheel are also connected to the legs to adjust the radius of the arc.

21 Claims, 2 Drawing Sheets

FIG. 1
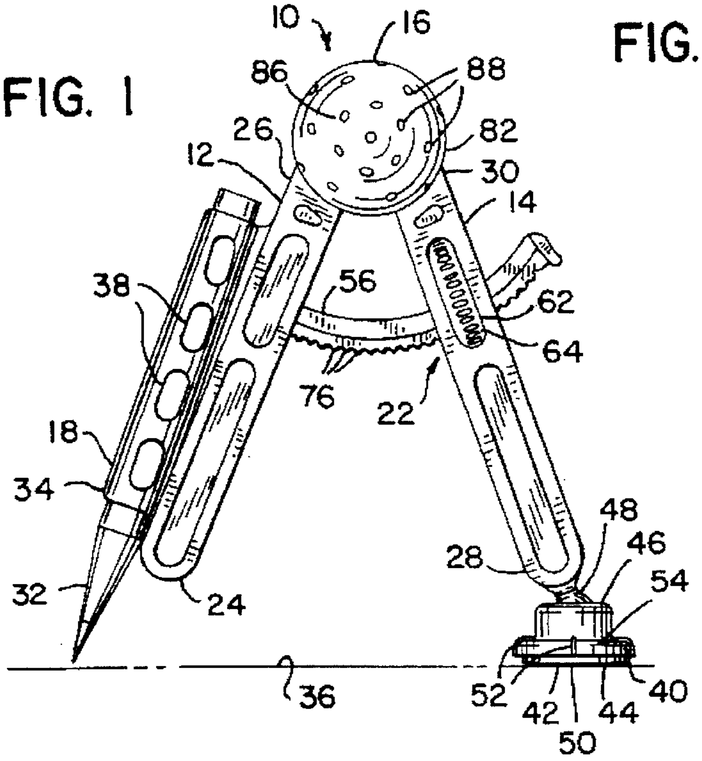
FIG. 2
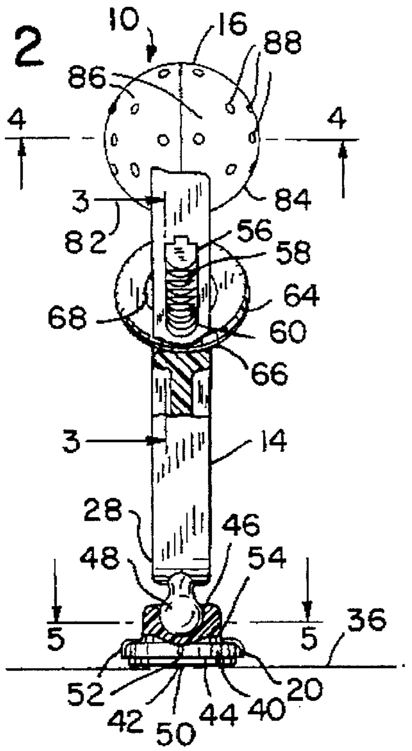
FIG. 3
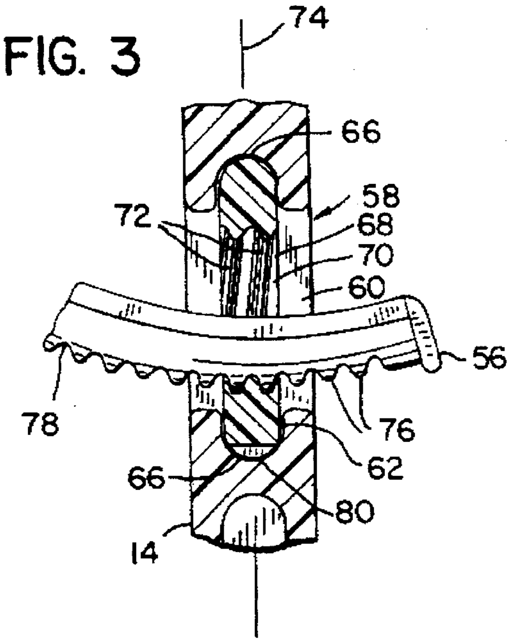
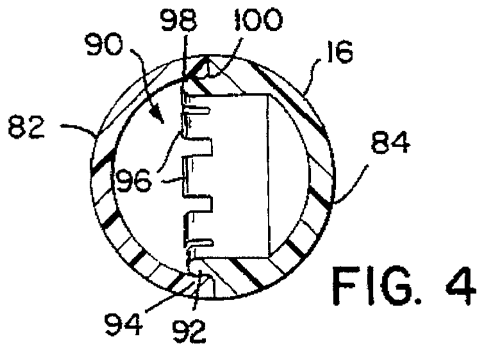
FIG. 4
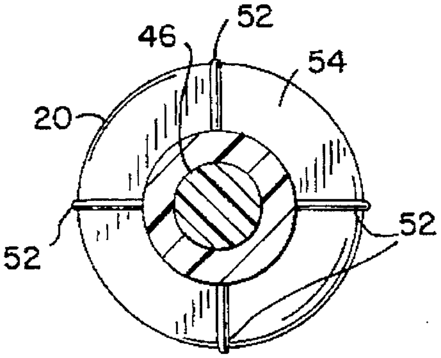
FIG. 5

DEVICE FOR DESCRIBING ARCS

FIELD OF THE INVENTION

The present invention relates generally to a device for describing arcs of generally constant radius, and particularly to a device having two legs pivotably attached at one end and including features which make it safe and easy to use for children.

BACKGROUND OF THE INVENTION

Devices for describing arcs are commonly known. Such devices often are referred to as compasses and include two legs pivotably attached at one end. The free ends of the legs can thus be pivoted towards or away from one another. By attaching a marking instrument, such as a pencil, to one leg and holding the other leg at a fixed pivot point, the marking instrument can be rotated about the pivot point to form an arc of generally constant radius.

One problem with this type of device is the difficulty of maintaining one leg at a fixed pivot point while the other leg and attached marking instrument are rotated about that point. Some compasses include a sharp, needle-like point at the free end of one leg. However, as one might imagine, these compasses can be extremely dangerous, particularly in the hands of younger children. Other compasses have a suction cup or pad to hold the pivot leg in place. Problems also arise in maintaining the compass at the fixed pivot point and in locating the precise center point of the desired arc or circle. Some devices have a pointer within a suction cup to help a user locate the desired center point of the arc with greater precision. The suction cup, however, must either be made of transparent material or have some type of window so the pointer can be seen. These configurations tend to be complicated and difficult to use, particularly if the devices are to be used by children learning about shapes and basic geometry.

Another problem with existing compasses is maintenance of the constant radius while the arc or circle is formed. Many compasses simply use a pivot joint between the legs which has a certain level of friction to limit unintentional movement of the legs with respect to each other. However, if the user provides excess pressure on the compass while describing an arc or circle, the legs will tend to spread, resulting in an unsatisfactory arc. Again, this is particularly a problem with younger children who may be learning to use a compass and inadvertently apply more pressure than the frictional pivot joint can withstand.

Other compasses include a threaded bar extending through threaded bores in each of the legs to maintain the legs at a fixed distance with respect to each other. The threaded bar typically includes threads of opposite direction, i.e. threads turned in one direction at one leg and threads turned in the opposite direction at the other leg. This is necessary so both legs can either be expanded or drawn together by turning the single threaded rod. Such a system is more expensive to manufacture and is not particularly susceptible to the use of plastic components.

Existing compasses are also often awkward to hold and somewhat difficult to use because of their design. There are no large, comfortable surface areas for grasping by a user. Again, this is particularly disadvantageous for young children learning to use compasses since their hands may lack the dexterity required to manipulate conventional devices.

The present invention addresses the drawbacks of current compass devices.

SUMMARY OF THE INVENTION

The present invention features a device for describing arcs. The device includes a pair of legs pivotably connected at one end by a pivot joint. Each leg also includes a free end opposite the pivot joint. A rack is affixed to one of the legs and oriented to extend through an opening in the opposite leg. The rack includes a plurality of teeth along at least one of its edges. A wheel is rotatably disposed in the opening and includes threads which cooperate with the plurality of teeth on the rack. Thus, by rotating the wheel, the threads act against the teeth of the rack to draw it through the opening in one direction or the other. An instrument holder may be attached to or built into one of the legs and is configured to hold an instrument for describing arcs. Examples of such instruments include a pencil for marking arcs and a cutter blade for cutting arcs.

According to a further aspect of the invention, a shoe is rotatably connected to the free end of the leg opposite the leg bearing the instrument holder. This allows the device and attached instrument to be moved in an arc or circle about the shoe. The shoe may also include alignment marks to facilitate centering over a specific point.

BRIEF DESCRIPTION OF THE DRAWINGS

The invention will hereafter be described with reference to the accompanying drawings, wherein like referenced numerals denote like elements, and:

FIG. 1 is a front view of a device for describing arcs according to a preferred form of the present invention;

FIG. 2 is a side view of the device of FIG. 1 including partially cut-away portions;

FIG. 3 is a lengthwise sectional view taken generally along line 3—3 of FIG. 2;

FIG. 4 is a cross-sectional view taken generally along line 4—4 of FIG. 2;

FIG. 5 is a cross-sectional view taken generally along line 5—5 of FIG. 2;

DETAILED DESCRIPTION OF THE PREFERRED EMBODIMENTS

Figure 9:
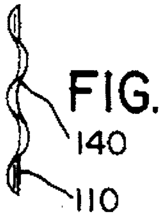
FIG. 9 is a front view of an alternate embodiment of the cutting disc.

Referring generally to FIGS. 1 and 2, a device 10 for describing arcs is illustrated. Device 10 generally includes a pair of legs which can be designated as first leg 12 and second leg 14, a pivot joint 16 connecting first leg 12 and second leg 14, an instrument holder 18, a shoe 20, and an adjustment mechanism 22 to adjust the position of first leg 12 with respect to second leg 14.

More specifically, first leg 12 includes a distal or free end 24 and a connector end 26, and second leg 14 similarly includes a distal or free end 28 and a connector end 30.

Connector ends 26 and 30 are affixed to pivot joint 16 to allow first leg 12 and second leg 14 to be pivoted about pivot joint 16. Free ends 24 and 28 move towards or away from one another as legs 12 and 14 are pivoted about joint 16.

Instrument holder 18 is designed to hold an instrument 32 for describing arcs, but its exact configuration will depend on which type of instrument 32 is desired. In the embodiment illustrated in FIG. 1, instrument holder 18 is designed to hold an instrument such as a pencil or pen. A pair of arcuate flanges 34 are preferably sized and disposed to apply pressure to instrument 32 and hold it in place as an arc is drawn on a surface 36. Arcuate flanges 34 can include a plurality of apertures 38 extending therethrough, or they can be solid.

Shoe 20 preferably includes a plate 40 having a non-slip surface 42 disposed for contact with surface 36. In the most preferred embodiment, plate 40 is generally cylindrical and non-slip surface 42 is created by adhesively applying a thin non-slip pad 44, such as a rubber pad, to plate 40. Shoe 20 also includes a socket 46 opposite non-slip surface 42. Socket 46 rotatably cooperates with a ball 48 affixed to free end 28 of second leg 14. Socket 46 is sized to resiliently hold ball 48 while allowing it to rotate or pivot within socket 46. Thus, when device 10 is operated, shoe 20 is placed in one location over a fixed center pivot point 50, and second leg 14 is rotated at that location to move first leg 12 and instrument 32 in an arc about point 50.

Shoe 20 is also designed to assist the user in precisely centering device 10 over center point 50. A plurality of alignment marks 52 are disposed on a visible surface 54 of shoe 20, preferably on the top and side surfaces of plate 40 over non-slip surface 42. If four alignment marks 52 are used, they are preferably placed at approximately 90° intervals around plate 40. In this manner, a user of device 10 can simply draw two perpendicular lines on surface 36 intersecting at center point 50. By aligning alignment marks 52 with the intersecting lines, the user is assured that shoe 20 is centered precisely over center point 50 and that all arcs or circles are described about that point.

Adjustment mechanism 22 includes an arcuate rack 56 extending from one leg generally towards the opposite leg. In the illustrated embodiment, rack 56 is attached to or integral with first leg 12 generally between free end 24 and connector end 26. Rack 56 extends towards second leg 14 and through a cross shaped opening 58 disposed in or along second leg 14. Opening 58 preferably includes a longitudinal channel 60 generally aligned with rack 56 and a transverse channel 62 oriented transversely to intersecting channel 60 and having rounded walls.

An adjustment wheel 64 is rotatably disposed in transverse channel 62 and rotates within a pair of opposed rounded grooves 66 of opening 58. Adjustment wheel 64 includes an opening 68 disposed generally at its radial center. Adjustment wheel 64 is located in a plane 74 which is generally transverse to the movement of rack 56.

As illustrated more clearly in FIG. 3, an inner wall 70 defines center opening 68 and includes threads 72. Threads 72 are oriented at an angle with respect to plane 74, as shown in FIG. 3, and are configured to cooperate with a plurality of teeth 76 disposed along an edge 78 of rack 56. As adjustment wheel 64 is rotated, threads 72 act against teeth 76, moving rack 56 either forward or backward with respect to longitudinal channel 60 of opening 58. This, of course, moves legs 12 and 14 either closer together or father apart, depending on the direction in which adjustment wheel 64 is rotated.

Preferably, rack 56 extends through center opening 70 to cooperate with threads 72. However, threads 72 can also be formed on a peripheral or outside surface 80 of adjustment wheel 64. Rack 56 would then extend through opening 58 external to adjustment wheel 64 and cooperate with the external threads. Additionally, opening 58 can have a variety of other configurations. For instance, longitudinal channel 60 can be formed through the center of second leg 14 as illustrated or through an edge of second leg 14. Longitudinal channel 60 can also be formed through a portion extending outwardly from second leg 14. Similarly, adjustment wheel 64 can turn within second leg 14, as shown, or it can be mounted alongside second leg 14. Opening 58 and adjustment wheel 64 can also be disposed in first leg 12 while rack 56 is affixed to second leg 14.

As illustrated in FIGS. 1 and 4, pivot joint 16 is preferably an enlarged, easy to grasp structure extending outwardly from connector ends 26 and 30 of first leg 12 and second leg 14, respectively. Pivot joint 16 can be a variety of shapes, but is preferably generally spherical, having a first hemisphere 82 and a second hemisphere 84 which are defined by an outer grasping surface 86. Outer surface 86 includes a plurality of indentations or projections 88 to facilitate gripping of pivot joint 16. Indentations or projections 88 may include a variety of configurations, such as dimples, crevices, bumps or ridges.

First hemisphere 82 and second hemisphere 84 are preferably connected by an internal press-fit connection 90 having an insert portion 92 and a socket portion 94 which are pressed together for interlocking but rotatable engagement. Insert portion 92 preferably includes resilient prongs 96 having a rounded, outwardly directed flange 98 which resiliently interlocks with an inwardly directed annular flange 100 on socket portion 94 to hold the first and second hemispheres together. However, numerous other types of interlocking mechanisms could also be used with pivot joint 16 to hold legs 12 and 14 in pivotable engagement. In the embodiment shown, leg 12 is integrally formed with hemisphere 82, whereas leg 14 is integrally formed with hemisphere 84. At the point of connection, the legs may partially overlap both hemispheres, but each leg is only integrally formed with one of the hemispheres to allow pivotable motion of the legs.

In its preferred embodiment each component is made of plastic although a variety of other materials could be used. Preferably, components which have sliding contact are made of dissimilar plastics or other materials to reduce wear. For example, the legs and rack may be made of nylon while the shoe and wheel are made of polycarbonate or vice versa. In another example, the legs and rack could be made of polyester while the shoe and wheel are made of styrene or vice versa.

Figure 6:
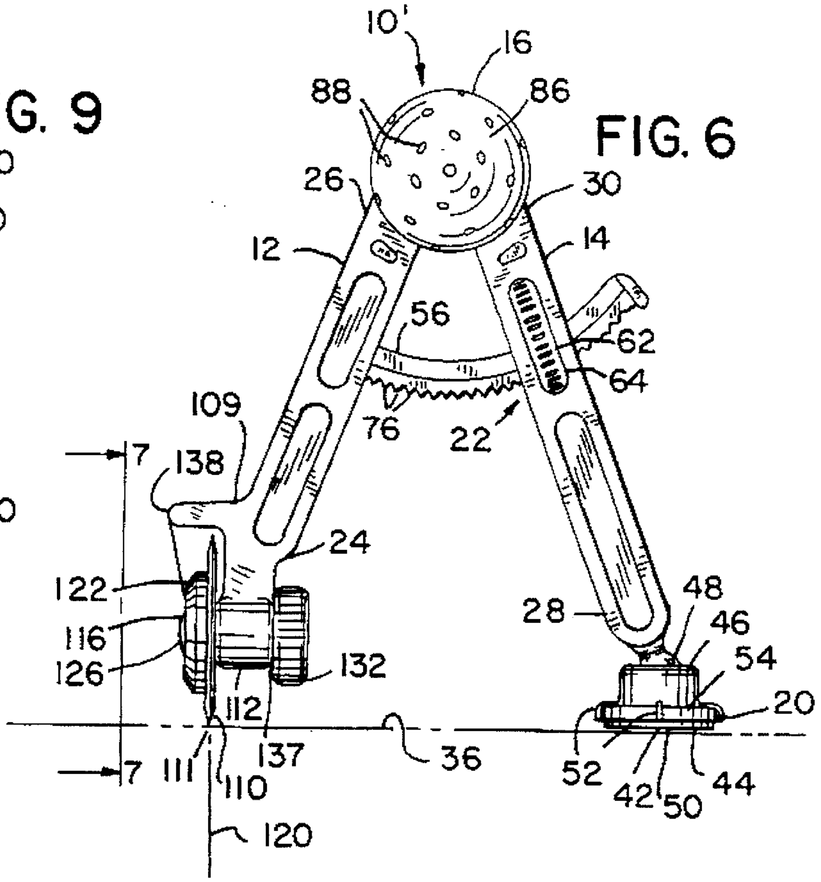
FIG. 6 is a front view of an alternate embodiment of the invention showing a cutting disc for cutting arcs.
Figure 8:
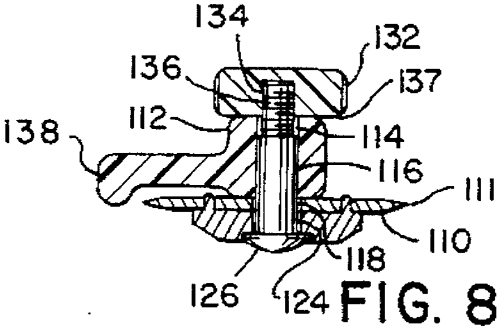
FIG. 8 is a cross-sectional view taken generally along line 8—8 of FIG. 7.

In FIG. 6, an alternate embodiment of the preferred invention is illustrated. In this embodiment, most features of the alternate device 10' remain the same as those illustrated in FIGS. 1–5 and are numbered accordingly. However, in this embodiment, an alternate instrument holder 109 is designed to hold a cutting disc 110 having a cutting edge 111. Instrument holder 109 is generally disposed at leg end 24 of first leg 12 as with instrument holder 18. A hub 112 is integrally formed in free end 24 and includes a bore 114 extending therethrough. (See FIG. 8). Bore 114 is sized to receive a retaining axle pin 116 which extends through a center aperture 118 of cutting disc 110 and into bore 114 to secure cutting disc 110 proximate hub 112 without inhibiting the rotation of cutting disc 110. As the device is pivoted about center point 50, cutting disc 110 rotates along surface 36 of, for instance, a sheet of paper or cloth, and cuts an arc of generally constant radius through the sheet. Cutting disc 110 is disposed in a plane 120 tangent to the arc being cut at the point of contact between cutting disc 110 and surface 36.

As illustrated, pin 116 may be combined with a retaining ring 122 having a center hole 124 through which retaining pin 116 extends. Retaining pin 116 includes an enlarged head 126 which holds retaining ring 122 adjacent cutting disc 110, supporting cutting disc 110 between hub 112 and retaining ring 122. Cutting disc 110 may be designed either to rotate with retaining ring 122 or to rotate independently of retaining ring 122 intermediate hub 112 and retaining ring 122, as illustrated.

Preferably, retaining pin 116 is held in bore 114 by a fastener, such as cap 132 disposed on an opposite side of hub 112 from cutting disc 110. Cap 132 includes a threaded hole 134 configured for engagement with a threaded end 136 of retaining pin 116. A spring washer 137 is preferably disposed intermediate cap 132 and hub 112. Depending on the desired design of pin 116, cap 132, and bore 114, pin 116 can either remain stationary while cutting disc 110 rotates about it or pin 116 can rotate with cutting disc 110.

Figure 7:
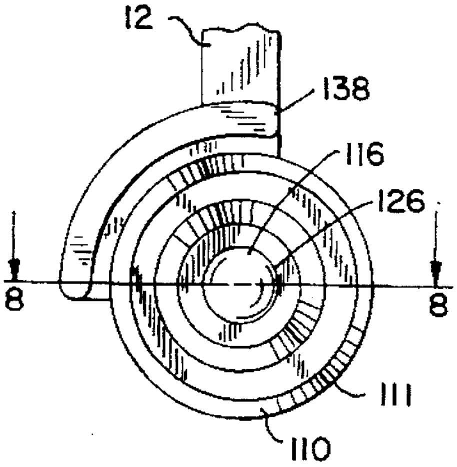
FIG. 7 is a side view taken generally along line 7—7 of FIG. 6 showing the cutting disc.

As illustrated in FIG. 7, instrument holder 109 preferably includes a safety flange 138 extending over cutting edge 111 for at least a portion of its length. Preferably, safety flange 138 extends at least approximately 90° along cutting edge 111 to prevent injury to the user of device 10.

Figure 10:
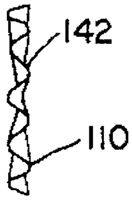
FIG. 10 is a front view of another alternate embodiment of the cutting disc.

In FIGS. 9 and 10, alternate cutting discs 110 are illustrated. In each of these designs, cutting edge 111 is formed in a different configuration. For instance, FIG. 9 shows a wave edge 140 designed to provide an arc of generally constant average radius, but having an undulating appearance. Similarly, FIG. 10 illustrates a pinking edge 142. Pinking edge 142 is designed to cut an arc of generally constant radius having more frequent undulations than obtained with the wave edge 140. With either edge 140 or edge 142, the arc of generally constant radius would actually be the average arc taken through the undulations.

It will be understood that the foregoing description is of preferred exemplary embodiments of this invention and that the invention is not limited to the specific form shown. For example, different instrument holders and instruments for describing arcs may be used, the rack and wheel may be reversed, various materials may be used, and various leg configurations can be constructed. These and other modifications may be made in the design and arrangement of the elements without departing from the scope of the invention as expressed in the appended claims.

I claim:

1. A device for describing arcs on a surface, the device comprising:

a pair of legs pivotably connected at one end by a pivot joint, each leg having a free end opposite the pivot joint;

a rack affixed to one leg of the pair of legs and oriented to extend through an opening on the opposite leg, the rack having a plurality of teeth along at least one edge;

a wheel having an outer periphery, the outer periphery rotatably disposed within the opening, the wheel including threads which cooperate with the plurality of teeth to move the rack and change the position of the legs with respect to each other when the wheel is rotated;

an instrument holder attached to one of the legs, the instrument holder being configured to hold an instrument for describing arcs; and a shoe rotatably connected to the free end of the leg opposite the leg bearing the instrument holder, wherein the leg connected to the shoe can be rotated in the shoe to move the instrument in an arc about the shoe.

2. The device of claim 1, wherein the wheel is mounted in a plane transverse to the direction of movement of the rack.

3. The device of claim 2, wherein the wheel comprises a ring having a central opening through which the rack extends, the wheel being rotatably disposed in a groove in the opening in the second leg.

4. The device of claim 3, wherein the central opening is defined by an internal wall in which the threads are disposed at an angle with respect to the plane of rotation.

5. The device of claim 1, wherein the instrument holder includes a pair of arcuate flanges configured to grip the instrument.

6. The device of claim 5, further comprising the instrument, wherein the instrument is a writing instrument.

7. The device of claim 1, further comprising the instrument, wherein the instrument is a cutting disk having a cutting edge.

8. The device of claim 7, wherein the instrument holder includes a hub having a bore extending therethrough, the instrument holder further including a retainer pin configured to extend through a center aperture of the disk and the hub bore to hold the cutting disk proximate the hub in a plane generally tangent to the arc being described.

9. The device of claim 8, wherein the instrument holder includes a safety flange disposed to cover at least part of the cutting edge.

10. The device of claim 7, wherein the cutting edge is undulated.

11. The device of claim 2, wherein the pivot joint includes a first hemisphere and a second hemisphere rotatably engaged, the pivot joint further including an extension surface generally in the shape of an expanded sphere to facilitate grasping by a user.

12. The device of claim 3, wherein the leg connected to the shoe includes a ball attached at its free end and the shoe includes a socket for receiving the ball.

13. The device of claim 12, wherein the legs are made of plastic.

14. The device of claim 13, wherein the wheel and shoe are made of plastic.

15. The device of claim 12, wherein the shoe includes alignment marks to assist in precisely locating the shoe at a center point, the shoe further including a non-slip layer disposed generally opposite the socket and configured for contact with the surface on which arcs can be described.

16. A compass to which an instrument may be attached to describe arcs of generally constant radius on a surface, the compass comprising:

a first leg and a second leg connected together at one end by a pivot joint, the first leg being configured to hold an instrument which describes an arc on a surface as the first leg is rotated about the second leg, the pivot joint including a first hemisphere and a second hemisphere rotatably engaged;

a rack affixed to one of the first or second legs and extending into cooperation with the opposite leg; and an adjustment mechanism mounted on the opposite leg and connected to the rack, wherein operating the adjustment mechanism moves the rack and pivots the first leg with respect to the second leg about the pivot joint.

17. The compass of claim 16, wherein the adjustment mechanism includes a wheel rotatably mounted to the opposite leg for rotation in a plane generally transverse to the movement of the rack, the wheel including a central opening having threads which cooperate with a plurality of teeth disposed along the rack to move the rack upon rotation of the wheel.

18. The compass of claim 17, further comprising a shoe rotatably attached to the second leg, the shoe having a generally flat bottom configured for engagement with the surface to support the second leg.

19. The compass of claim 17, wherein the first hemisphere includes an inwardly directed annular flange, and the second hemisphere includes an outwardly directed annular flange, the first and second hemisphere being rotatably interconnected by engagement of the inwardly directed annular flange and the outwardly directed annular flange; and the pivot joint has a spherical shape and includes a plurality of alterations to facilitate grasping by a person using the compass.

20. The compass of claim 17, wherein the first leg and the second leg include nylon and the wheel includes polycarbonate.

21. A compass to which an instrument may be attached to describe arcs of generally constant radius on a surface, the compass comprising:

a first leg having a first pivot end and a first distal end opposite the first pivot end;

a second leg having a second pivot end and a second distal end opposite the second pivot end;

a pivot joint connected to the first pivot end and the second pivot end, the pivot joint allowing the first and second legs to pivot towards and away from each other about the pivot joint;

a rack affixed to one of the first or second legs and extending through an opening in the opposite leg, the rack having an arcuate form;

a wheel having a ring with an outer periphery, and a central aperture, the ring having internal threads along the central aperture which cooperate with the rack proximate the opening to move the rack with respect to the opening and adjust the position of the first leg with respect to the second leg;

an instrument for describing arcs; and a shoe having a generally flat bottom configured to support the compass on the surface, wherein the instrument and the shoe are connected to opposite legs and the shoe is rotatably attached to facilitate the describing of arcs.

* * * * *